(12) United States Patent
Yamamoto

(10) Patent No.: US 9,283,902 B2
(45) Date of Patent: Mar. 15, 2016

(54) TETHER CLIP AND GARNISH ATTACHMENT DEVICE INCLUDING THE SAME

(71) Applicant: Kazuhito Yamamoto, Toyota-shi (JP)

(72) Inventor: Kazuhito Yamamoto, Toyota-shi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/361,053

(22) PCT Filed: Nov. 27, 2012

(86) PCT No.: PCT/IB2012/002487
§ 371 (c)(1),
(2) Date: May 28, 2014

(87) PCT Pub. No.: WO2013/080012
PCT Pub. Date: Jun. 6, 2013

(65) Prior Publication Data
US 2014/0319808 A1      Oct. 30, 2014

(30) Foreign Application Priority Data
Nov. 30, 2011    (JP) .................................. 2011-262859

(51) Int. Cl.
| B60R 21/216 | (2011.01) |
| B60R 13/02  | (2006.01) |
| B60R 21/213 | (2011.01) |
| B60R 21/232 | (2011.01) |

(52) U.S. Cl.
CPC ........... *B60R 13/0206* (2013.01); *B60R 21/213* (2013.01); *B60R 21/216* (2013.01); *B60R 21/232* (2013.01); *Y10T 24/43* (2015.01)

(58) Field of Classification Search
CPC .. B60R 13/0206; B60R 21/213; B60R 21/216
See application file for complete search history.

(56) References Cited

U.S. PATENT DOCUMENTS

| 4,342,438    | A  |   | 8/1982  | Speedie |
| 5,725,271    | A  | * | 3/1998  | Patel et al. ............... 296/187.05 |
| 7,077,449    | B2 | * | 7/2006  | Tokunaga .................... 296/39.1 |
| 2004/0108421 | A1 | * | 6/2004  | Yuta et al. ....................... 248/71 |
| 2004/0245798 | A1 |   | 12/2004 | Tokunaga |
| 2005/0071959 | A1 | * | 4/2005  | Minnich et al. ................. 24/297 |
| 2006/0032029 | A1 | * | 2/2006  | Nessel et al. .................... 24/289 |
| 2006/0032030 | A1 | * | 2/2006  | Nessel et al. .................... 24/289 |

(Continued)

FOREIGN PATENT DOCUMENTS

| JP | A-2003-95033  | 4/2003 |
| JP | A-2006-176089 | 7/2006 |

(Continued)

*Primary Examiner* — Barry Gooden, Jr.
(74) *Attorney, Agent, or Firm* — Oliff PLC

(57) ABSTRACT

A tether clip includes: a seat portion; a tether portion standing on the seat portion; an anchor portion connecting to one end portion of the tether portion that is opposite to the other end portion thereof; an engagement retention portion located at each of both sides of the tether portion and standing on the seat portion on the same side as the tether portion; and an independence facilitation structure provided between the tether portion and each of the engagement retention portions and the tether portion when the tether clip received load in a first direction parallel to the seat portion and orthogonal to a direction of a line that connects the engagement retention portions provided at the both sides of the tether portion and is parallel to the seat portion.

11 Claims, 5 Drawing Sheets

(56) References Cited

U.S. PATENT DOCUMENTS

| | | |
|---|---|---|
| 2007/0075531 A1 | 4/2007 | Tsuge |
| 2008/0235919 A1* | 10/2008 | Giddings et al. ................ 24/289 |
| 2010/0199464 A1* | 8/2010 | Sano ............................... 24/289 |
| 2011/0133434 A1 | 6/2011 | Kirchen et al. |
| 2013/0152346 A1* | 6/2013 | Kim .................... B60R 13/0206 24/289 |
| 2013/0168515 A1* | 7/2013 | Yamamoto ............... 248/231.81 |
| 2014/0008501 A1* | 1/2014 | Satou et al. .................. 248/68.1 |
| 2014/0225355 A1* | 8/2014 | Risdale ...................... 280/743.2 |
| 2014/0300133 A1* | 10/2014 | Hinokio et al. ............. 296/146.7 |
| 2015/0191131 A1* | 7/2015 | Yamamoto ................ F16B 2/20 24/289 |
| 2015/0210227 A1* | 7/2015 | Yamamoto ............ B60R 13/025 296/193.06 |

FOREIGN PATENT DOCUMENTS

| | | |
|---|---|---|
| JP | A-2007-98986 | 4/2007 |
| JP | A-2011-157054 | 8/2011 |
| JP | A-2011-161946 | 8/2011 |
| WO | WO 2009/029478 A1 | 3/2009 |
| WO | WO 2010/016982 A1 | 2/2010 |

\* cited by examiner

TETHER CLIP AND GARNISH ATTACHMENT DEVICE INCLUDING THE SAME

BACKGROUND OF THE INVENTION

1. Field of the Invention

The invention relates to a tether clip and to a garnish attachment device including the tether clip.

2. Description of the Related Art

Japanese Patent Application Publication No. 2007-98986 (JP 2007-98986 A) and FIG. 5 show a related-art tether clip. FIG. 6 is a sectional view of the tether clip shown in FIG. 5 and a garnish in a state in which the tether clip is attached to the garnish. As shown in FIG. 5, a related-art tether clip 110 includes a tether portion 120, an anchor portion 130, engagement retention portions 140 positioned at both sides of the tether portion 120, and a seat portion 150. A direction parallel to the seat portion 150 and orthogonal to the direction of a line that connects the two engagement retention portions 140 provided at both sides of the tether portion is defined as a first direction D1, and the direction of the line that is parallel to the seat portion 150 and that connects the engagement retention portions 140 at the two sides of the tether two portion (the direction orthogonal to the first direction) is defined as a second direction D2, and a direction orthogonal to the first and second directions is defined as a third direction D3. The tether portion 120 has posts 122 that stand on the seat portion 150 in a direction orthogonal to the seat portion 150 and that has a cross shape or a rectangular shape in cross section, and a curved portion 124 that connects to the posts 122 and is curved into the first direction D1. The anchor portion 130 connects to the tether portion 120. Each of the engagement retention portions 140 has a standing portion 142 that stands on the seat portion 150 on the same side as the tether portion 120, and a bulge portion 144 that connects to the standing portion 142 and that bulges in the first direction D1. The engagement retention portions 140 are elastically deformable in the first direction D1. The tether portion 120 and the engagement retention portions 140 are joined integrally to each other at least at a junction portion 200 that is provided at distal ends of the bulge portions 144 of the engagement retention portions 140.

As shown in FIG. 6, the tether clip 110 is used to attach a garnish 180 having a housing portion that is provided with a garnish stopper hole. 188, to a pillar (e.g., a front pillar) 190 of a vehicle. When the tether clip 110 has been mounted on the garnish 180, the posts 122 of the tether portion 120 and the standing portions 142 of the engagement retention portion 140 have been inserted through the garnish stopper hole 188. The width of the posts 122 in the first direction D1 and the width of the standing portions 142 in the first direction D1 are equal to each other, and side surfaces of the posts 122 facing in the first direction D1 and side surfaces of the standing portion 142 facing in the first direction D1 are in contact with side surfaces of an edge portion of the garnish stopper hole 188.

Normally, the garnish stopper hole edge portion of the garnish 180 is clamped between the bulge portions 144 of the engagement retention portions 140 and the seat portion 150, so that the garnish 180 and the tether clip 110 are engaged with each other in the third direction D3. When a curtain airbag 100 is deployed, the deploying curtain airbag 100 pushes the garnish 180 in a resultant direction having components of the first and third directions D1 and D3. When the garnish 180 is thus opened halfway in a direction away from the pillar 190, the anchor portion 130 engages with the garnish stopper hole edge portion, preventing the garnish 180 from flying apart.

However, the related-art tether clip 110 has the following problems. (a) The tether portion 120 and the engagement detention portions 140 are joined integrally to each other at the junction portion 200. Therefore, when during an early period of the deployment of the curtain airbag 100, load is exerted from the garnish stopper hole 188 to the tether clip 110 in the first direction D1 or in the third direction D3 away from the seat portion 150, load is applied to the tether portion 120 not only from the garnish stopper hole 188 but also from the engagement retention portions 140 via the junction portion 200, so that the load exerted to a base portion 120a of the tether portion 120 becomes large.

(b) Since the tether portion 120 and the engagement retention portions 140 connect to each other via the junction portion 200, deformation of the engagement retention portion 140 and the tether portion 120 is prevented.

(b-1) As a result, during an early period of the deployment of the curtain airbag 100, stress concentration is likely to occur at the base portion of the tether portion 120.

(b-2) Furthermore, since the engagement retention portions 140 are also not easily deformed, the garnish stopper hole 188 less easily moves over the bulge portions 144 of the engagement retention portion 140 and therefore the garnish 180 less easily opens during an early period of the deployment of the curtain airbag 100.

(b-3) It is often impossible to secure a large space within a housing portion 184 of the garnish 180 due to restrictions in terms of space. Meanwhile, the longer the tether portion 120 is, the greater the amount of opening of the garnish 180 during an early period of the deployment of the curtain airbag 100 is, that is, the more easily the curtain airbag 100 can deploy into the vehicle cabin through the opening between the pillar 190 and an end portion of the garnish 180 in a width direction of the garnish 180. For this reason, a length of the tether portion 120 is secured bending the tether portion 120 within the housing portion 184. However, the housing portion 184 becomes narrower in space toward the base portion side of the tether portion 120 due to the space restrictions. Therefore, the tether portion 120 and the anchor portion 130, which are not easily deformed in the first direction D1, contact and interfere with inner wall surfaces of the housing portion 184, so that the sliding resistance increases. Due to this, the garnish 180 is less easily opened during an early period of the deployment of the curtain airbag 100. Furthermore, this also makes it difficult to attach and detach the tether clip 110.

(c) Since no clearance in the first direction D1 exists between the tether portion 120 and the edge portion of the garnish stopper hole 188, load from the garnish 180 is applied to the tether portion 120 at the same timing as the timing of application of load to the engagement retention portion 140 during an early period of the deployment of the curtain airbag 100. Furthermore, since the posts 122 of the tether portion 120 have a dimension equal to the width of the garnish stopper hole 188 in the first direction D1, and are not easily elastically deformed, load is likely to be applied to the base portion 120a of the tether portion 120 in an uneven manner.

SUMMARY OF THE INVENTION

The invention provides a tether clip and a garnish attachment device including the tether clip, in which rupture of a tether portion at a base portion thereof is restrained or prevented by reducing the load exerted to the base portion of the tether portion when lateral load is exerted thereto.

A tether clip in accordance with a first aspect of the invention includes: a seat portion; a tether portion that stands on the seat portion; an anchor portion that connects to one end portion of the tether portion that is opposite to the other end portion thereof that is closer to the seat portion than the one end portion; an engagement retention portion that is located at each of both sides of the tether portion and stands on the seat portion on the same side as the tether portion; and an independence facilitation structure that is provided between the tether portion and each of the engagement retention portions and that is configured to facilitate movement of the engagement retention portions and movement of the tether portion independent of each other when the tether clip receives load in a first direction that is parallel to the seat portion and is orthogonal to a direction of a line that connects the engagement retention portions provided at the both sides of the tether portion and is parallel to the seat portion.

In the tether clip of the first aspect, the independence facilitation structure may include a clearance provided between the tether portion and at least a distal end portion of a corresponding one of the engagement retention portions.

In the tether clip of the first aspect, the clearance may be provided throughout an entire length of the corresponding one of the engagement retention portions.

In the tether clip of the first aspect, the independence facilitation structure may include a link portion that has a fragile portion configured to rupture when the tether clip receives a load, the link portion connecting the tether portion and a corresponding one of the engagement retention portions.

In the tether clip of the first aspect, the tether portion may extend in a direction orthogonal to the seat portion; each of the engagement retention portions may have a standing portion that stands on the seat portion at a corresponding one of the both sides of the tether portion, and a bulge portion that connects to the standing portion and that bulges in the first direction; and the bulge portion may be elastically deformable in the first direction.

In the tether clip of the first aspect, the tether portion may have a straight portion that extends straight in a direction orthogonal to the seat portion. The tether portion may have a curved portion that connects to the straight portion. The tether portion may continuously and smoothly vary in cross section between the straight portion and the curved portion.

According to the tether clip of the first aspect, since the tether portion and the engagement retention portion are separate from each other, there no longer occurs load from the engagement retention portions to the tether portion when load acts on the engagement retention portions. Therefore, the load exerted to the base portion of the tether portion is reduced, so that rupture of the tether portion at the base portion is restrained or prevented. Furthermore, since the tether portion and the engagement retention portions are separate from each other, they are deformable independently of each other. Therefore, both the tether portion and the engagement retention portions are more flexible than the tether portion and the engagement retention portion of the related-art tether clip.

When the tether portion has the straight portion, a higher detachability of the attachment object piece from the tether clip is achieved. When the tether portion has the curved portion, a longer length of the tether portion is secured even in a narrow space. In addition, when the tether portion continuously and smoothly varies in cross section between the straight portion and the curved portion, stress concentration in the tether portion becomes less likely to occur, so that it is possible to more reliably restrain or prevent rupture of the tether portion.

In the tether clip of the first aspect, a thickness of the straight portion in the first direction may be smaller than an external dimension of the standing portion of each engagement retention portion in the first direction. The minimum dimension may be a dimension of the standing portion of each engagement retention portion in the first direction.

In the case where the thickness of the tether portion in the first direction is set to be less than the thickness of each engagement retention portion, a clearance in the first directions is formed between the straight portion of the tether portion and the edge portion of the stopper hole of an attachment object piece through which the tether portion is inserted. Between the standing portions of the engagement retention portions and the edge portion of the stopper hole, there are no clearances or there are no clearances that are as large as a clearance formed between the edge portion of the stopper hole and the straight portion of the tether portion. As a result, when the attachment object piece is moved relative to the tether clip and the tether clip receives load in the first direction from the attachment object piece, the timing at which load is exerted to the tether portion is later than the timing at which load is exerted to the engagement retention portions, by the amount of time of the movement or stroke of the attachment object piece across the clearance. Furthermore, during the stroke across the clearance, the engagement retention portions deform and the load exerted to the tether clip in the first direction is reduced. Therefore, the load that acts on the tether portion is reduced. This also further restrains rupture of the tether portion at the base portion.

In the tether clip of the first aspect, a corner at a base portion of a side of the straight portion of the tether portion may be rounded, the side of the straight portion facing in the first direction.

In the case where the base portion of the tether portion is provided with the rounded portion, there is a reduction of the concentration of stress at the base portion when the tether clip receives load in the first direction. This also restrains rupture of the base portion of the tether portion. Furthermore, the edge portion of the stopper hole, through which the tether portion is inserted, of the attachment object piece, to which the tether clip is attached, moves in the first direction and runs on the rounded portion, producing component forces in such directions that the edge portion of the stopper hole slips off from the tether clip. This also improves the detachability of the attachment object piece from the tether clip.

A garnish attachment device in accordance with a second aspect of the invention includes: a garnish that has a housing portion that is provided with a garnish stopper hole; a pillar of a vehicle; a curtain airbag disposed beside the housing portion between the garnish and the pillar; and the tether clip of the first aspect which is used to attach the garnish to the pillar of the vehicle. Each of the engagement retention portions has a bulge portion that bulges in the first direction and that engages with on an edge portion of the garnish stopper hole and retains the edge portion of the garnish stopper hole between the seat portion and the bulge portion. The anchor portion is configured so that during an early period of deployment of the curtain airbag, the anchor portion is brought into engagement with the edge portion of the garnish stopper hole with the garnish open halfway so as to prevent the garnish from flying apart.

In the garnish attachment device of the second aspect, the first direction of the tether clip may be set to coincide with a width direction of the garnish, a second direction orthogonal to the first direction of the tether clip and parallel to the seat portion may be set to coincide with a longitudinal direction of the garnish, the garnish stopper hole may be a rectangular hole, and a direction of short sides of the garnish stopper hole may be set to coincide with the first direction of the tether clip.

According to the garnish attachment device of the second aspect, since the tether portion and the engagement retention portions are separate from each other, there no longer occurs load from the engagement retention portions to the tether portion when the garnish opens. Thus, the load exerted to the base portion of the tether portion is reduced and rupture of the tether portion at the base portion is restrained, so that the garnish is prevented from flying apart. Furthermore, since the tether portion and the engagement retention portions are deformable independently of each other, both the tether portion and the engagement retention portions are more flexible than the tether portion and the engagement retention portions of the related-art tether clip. As a result, concentration of stress at the base portion of the tether portion at the time of deployment of the curtain airbag is restrained, and rupture of the tether portion is restrained. Furthermore, breakage of the garnish during an early period of the deployment of the curtain airbag is prevented or restrained. Furthermore, the detachability of the garnish from the tether clip is improved, and the garnish can be deployed early. Further, it becomes easy to remove the garnish from the tether clip and assemble the garnish to the tether clip at the time of service.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

A tether clip 10 in accordance with an embodiment of the invention and a garnish attachment device 70 equipped with the tether clip in accordance with an embodiment of the invention will be described with reference to FIGS. 1 to 4.

Figure 1:
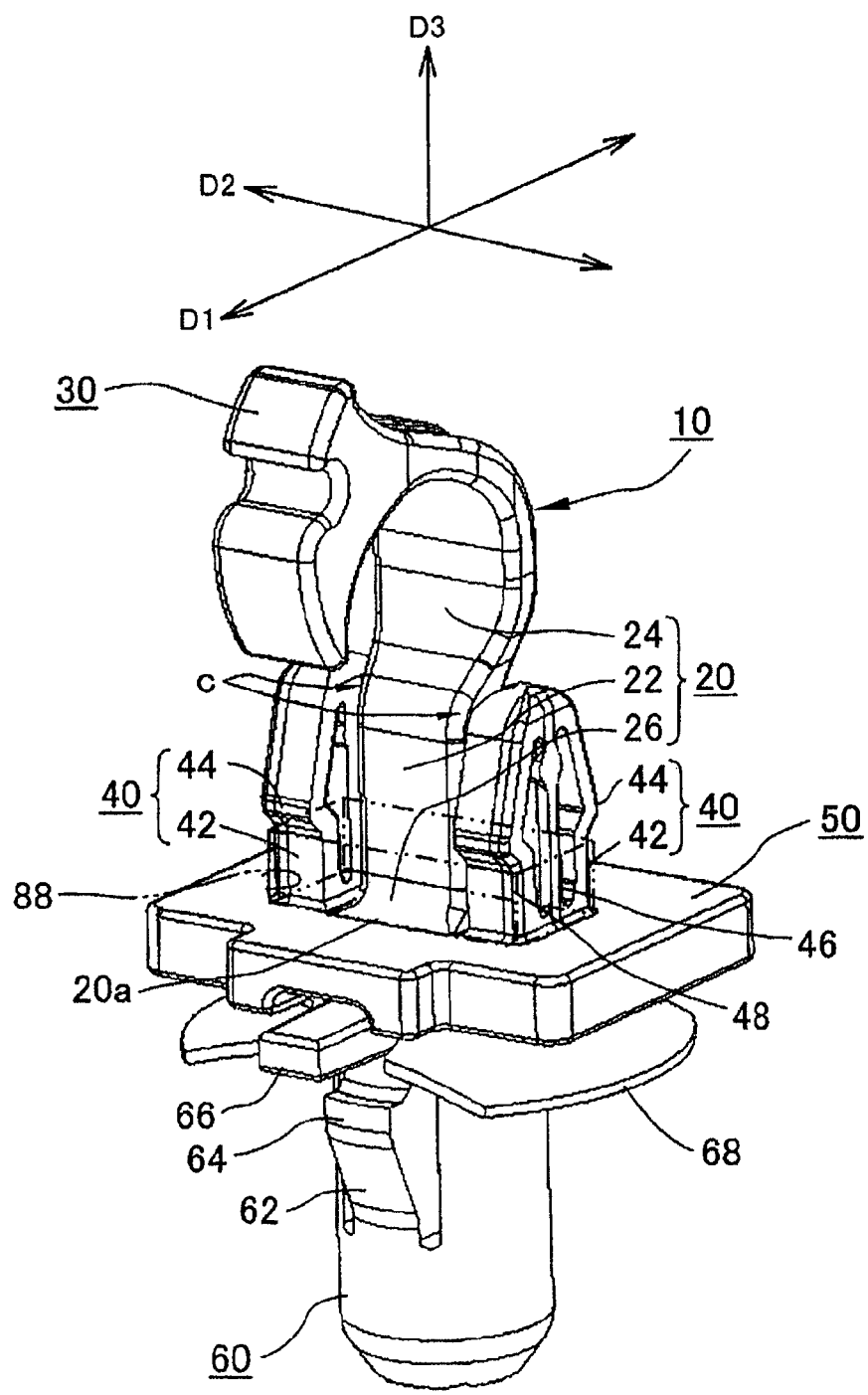
FIG. 1 is a perspective view of a tether clip as a discrete part in accordance with an embodiment of the invention.

Firstly, the tether clip 10 as a discrete part will be described. The tether clip 10 is made of a resin material that has elasticity. As shown in FIG. 1, the tether clip 10 includes a tether portion 20, an anchor portion 30, engagement retention portions 40 provided at both sides of the tether portion 20, and a seat portion 50. Furthermore, the tether clip 10 is provided with a body attachment portion 60. A first direction D1, a second direction D2 orthogonal to the first direction, and a third direction D3 orthogonal to the first and second directions are set with respect to the tether clip 10. The first direction D1 is orthogonal to the direction of a line that connects the two engagement retention portions 40, and the second direction D2 is parallel to the line that connects the two engagement retention portions 40. The first and second directions D1 and D2 are parallel to the seat portion 50.

As shown in FIG. 1, the seat portion 50 is made of a generally rectangular platy plate that has a thickness. The short sides of the generally rectangular seat portion 50 are directed so as to be parallel to the first direction D1, and the long sides of the seat portion 50 are directed so as to be parallel to the second direction D2. A direction of thickness of the seat portion 50 is set to coincide with the third direction D3.

Figure 2:
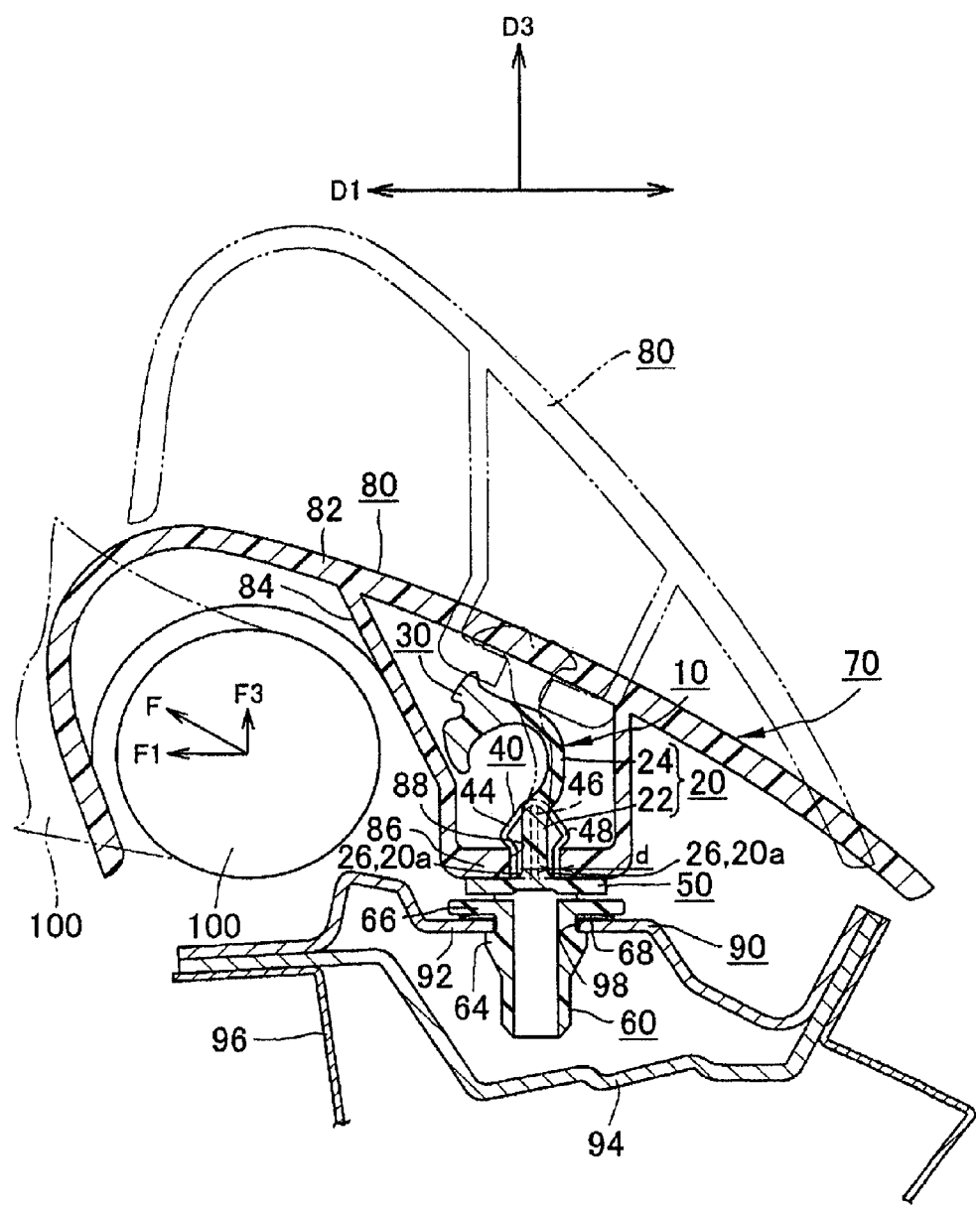
FIG. 2 is a sectional view of the tether clip shown in FIG. 1 and a garnish attachment device in a state in which the tether clip is attached to an attachment object piece (e.g., a garnish), and is attached to a pillar.
Figure 3:
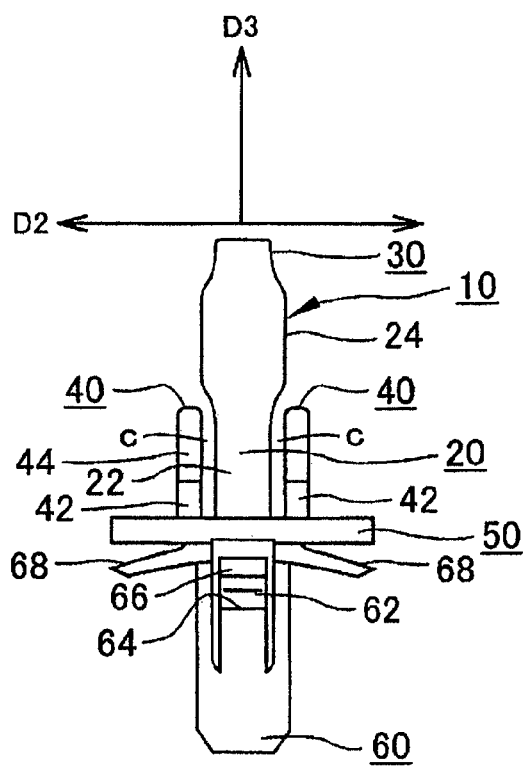
FIG. 3 is a front view of the tether clip shown in FIG. 1 when viewed from a first direction D1.
Figure 4:
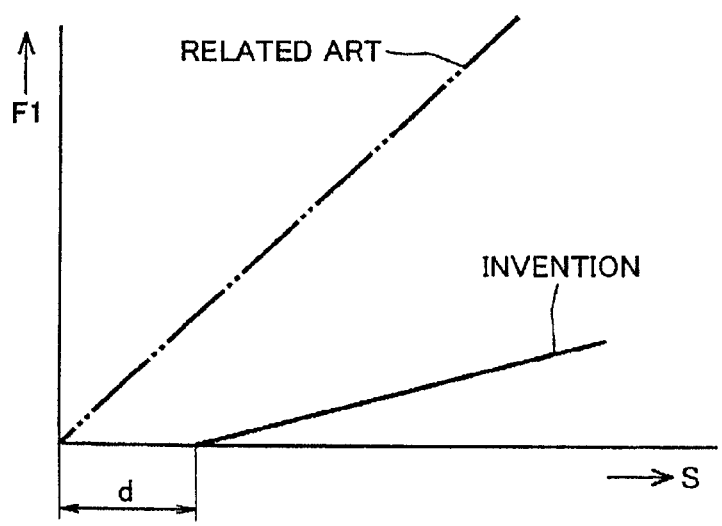
FIG. 4 is a load-stroke graph showing the tendencies of relationship between a load component F1 in the first direction D1 of the load F exerted to the tether clip and the stroke S of an attachment object piece (e.g., a garnish), to which the tether clip is attached, relative to the tether clip in the first direction, with a solid line showing the tendency in the invention and a chain double-dashed line showing the tendency in the related-art construction shown in FIGS. 5 and 6.
Figure 5:
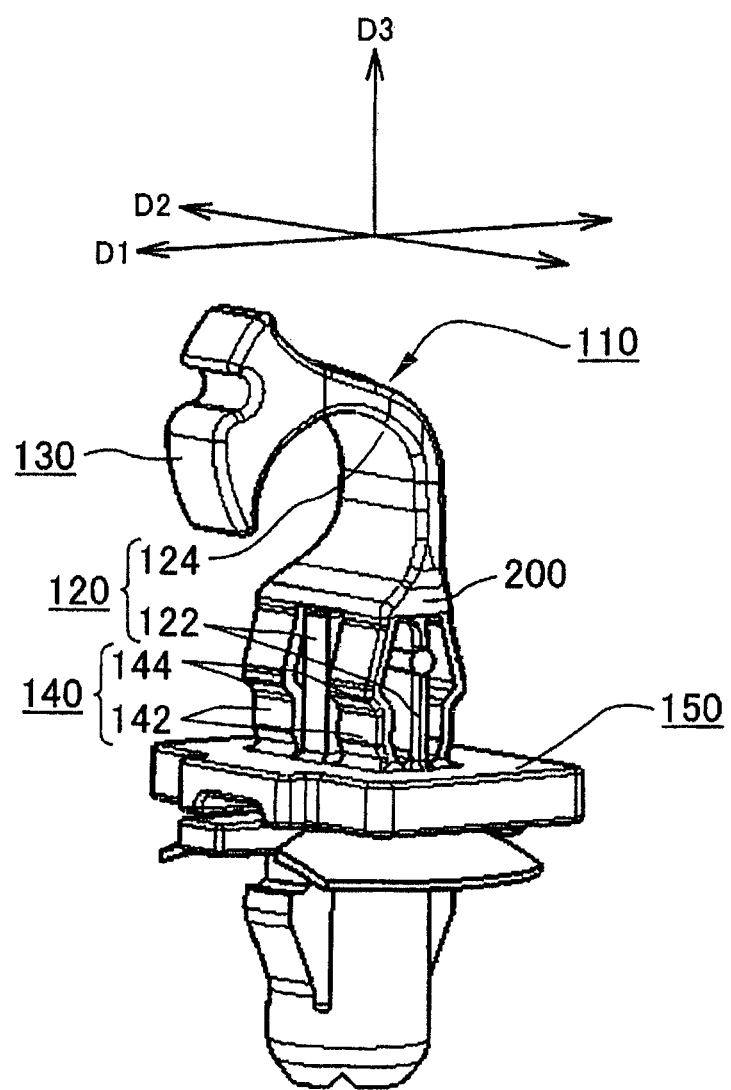
FIG. 5 is a perspective view of a related-art tether clip as a discrete part, corresponding to FIG. 1.
Figure 6:
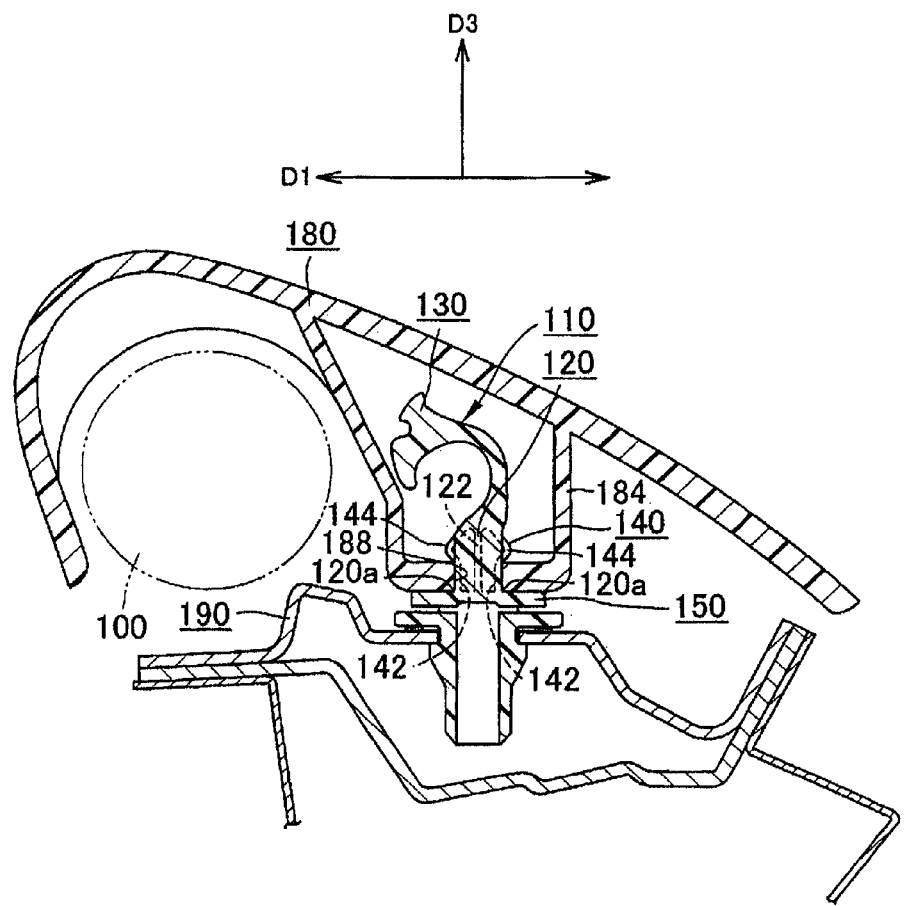
FIG. 6 is a sectional view of the tether clip shown in FIG. 5 and a garnish in a state in which the tether clip is attached to the garnish, and corresponds to FIG. 2.

As shown in FIGS. 1 to 3, the tether portion 20 has a straight portion 22 that stands on the seat portion 50 and extends straight in the third direction D3, and a curved portion 24 that connects to an end portion of the straight portion 22 on the side opposite to the seat portion 50 side and that is curved into the first direction D1. A section of each of the curved portion 24 and the straight portion 22 taken along a plane orthogonal to the longitudinal direction of the tether portion 20 has a rectangular shape. The straight portion 22 has a thickness in the first direction D1, and has a width in the second direction D2. The thickness of the straight portion 22 is smaller than the width of the straight portion 22. The width direction of the curved portion 24 is the same as the width direction of the straight portion 22, and the thickness direction of the curved portion 24 is orthogonal to the width direction of the curved portion 24. The thickness of the curved portion 24 is equal to or approximately equal to the thickness of the straight portion 22, and the width of the curved portion 24 is equal to or greater than the width of the straight portion 22.

As shown in FIGS. 1 and 2, the anchor portion 30 connects to an end portion of the tether portion 20 on the side opposite to the seat portion 50 side, that is, an end portion of the curved portion 24 on the side opposite to the straight portion 22 side. The anchor portion 30 has a width in the second direction D2, and has a thickness in a direction orthogonal to the width. The anchor portion 30, when viewed from the second direction D2, has a ginkgo leaf shape that gradually expands from an end portion of the anchor portion 30 at the side, on which the anchor portion 30 connects to the curved portion 24, toward an end portion at the opposite side. The thickness of the anchor portion 30 increases toward a distal end of the ginkgo leaf shape. The width of the anchor portion 30 is equal or approximately equal to the width of the straight portion 22 of the tether portion 20.

As shown in FIGS. 1 and 2, the two engagement retention portions 40 are provided at both sides of the tether portion 20 in the second direction D2. Each of the engagement retention portions 40 has standing portions 42 that stand on the seat portion 50 to the same side as the tether portion 20 side, and bulge portions 44 each of which connects to a corresponding one of the standing portions 42 and bulges in the first direction D1. The engagement retention portions 40 are elastically deformable in the first direction D1.

As shown in FIG. 1, each of the engagement retention portions 40 in a view from the second direction D2 has, at a center of the engagement retention portion 40 in the first direction D1, a straight central wall 46 that rises straight in the third direction D3 from a seat portion 50, and also has, at each of two opposite sides (left and right sides) of the central wall 46 in the first direction D1, a bent wall 48 that extends in the third direction D3 from the seat portion 50 and that, at an intermediate location in its height in the third direction D3, bends and protrudes in a direction away from the central wall 46, and that then extends in such a direction as to approach the central wall 46 and joins at its distal end to the central wall 46. There are spaces formed between the central wall 46 and the left and right bent walls 48, except for a junction portion at the distal end. If the left and right bent walls 48 are pushed in the first direction D1 from the sides opposite to the central wall 46, the bent walls 48 can be elastically deformed toward the central wall 46.

As shown in FIG. 3, between the tether portion 20 and each of the engagement retention portions 40, there is provided an independence facilitation structure c that allows the tether portion 20 and the engagement retention portions 40 to move independently of each other when the tether clip 10 receives load in the first direction D1.

Each of the two independence facilitation structures c includes a clearance c that is provided between the tether portion 20 and at least a distal end portion of each of the engagement retention portions 40 (a portion of the engagement retention portion 40 on the side closer to the distal end with respect to a center point of the engagement retention portion 40 in its height). At a base portion of each engagement retention portion 40 at the seat portion 50 side, the clearance c between the tether portion 20 and the engagement retention portion 40 may be absent. It is desirable that the clearance c of the independence facilitation structure c be provided between the tether portion 20 and a corresponding one of the engagement retention portions 40, throughout the entire length of the engagement retention portion 40. Each independence facilitation structure c may include a link portion c that connects the tether portion and a corresponding engagement retention portion and that has a fragile portion that ruptures when the tether clip 10 receives a load. The fragile portion of the link portion c of the independence facilitation structure c is a thin-walled portion or a notch, for example.

In an example shown in FIG. 3, the independence facilitation structures c include the clearances c, each of which is provided between the tether portion 20 and a corresponding one of the engagement retention portions 40 so as to extend in the second direction D2. The clearances c extend in the first direction D1 throughout the entire length of the engagement retention portions 40 in the first direction D1. Thus, the clearances c separate the engagement retention portions 40 from the tether portion 20, throughout the entire length of the engagement retention portions 40 in the third direction D3 (the entire height thereof). In the example shown in FIG. 3, the tether portion 20 connects to the engagement retention portions 40 only via the seat portion 50, and the tether portion 20 and the engagement retention portions 40, after rising from the seat portion 50, do not connect to each other, so that the tether portion 20 and the engagement retention portions 40 can be elastically deformed independently of each other.

The tether clip 10 may have a structure as follows. Firstly, as shown in FIGS. 1 and 2, the thickness of the straight portion 22 of the tether portion 20 in the first direction D1 is smaller than an external dimension of the standing portion 42 of each engagement retention portion 40 in the first direction D1 (i.e., the distance between the outer surfaces of the left and right bent walls 48 in the standing portion 42).

FIG. 2 shows a state in which the tether clip 10 has been attached to a stopper hole 88 of a front pillar garnish 80 that is an attachment object piece, to which the tether clip 10 is attached, and in which the garnish 80 has been mounted to a front pillar 90. As shown in FIG. 2, between the straight portion 22 of the tether portion 20 and an edge portion of the stopper hole 88, there is a clearance d on each of two opposite sides of the straight portion 22 in the first direction D1. The thickness of the straight portion 22 of the tether portion 20 is smaller by 2 d than the external dimension of the standing portion 42 of each engagement retention portion 40 in the first direction D1. Between the engagement retention portions 40 and the edge portion of the stopper hole 88, there are no clearances in the first direction D1 or there are no clearances in the first direction D1 that are as large as the clearances d.

Furthermore, a base portion 20a of the straight portion 22 of the tether portion 20 is provided with rounded portions 26 whose surfaces are curved into the first direction D1 (hereinafter, referred to as "R portions 26"). The R portions 26 are each curved to such a side that the thickness of the straight portion 22 in the first direction D1 increases as the distance from the seat portion 50 decreases. The radius of each of the R portions 26, desirably, is equal to the dimension of the clearances d.

The body attachment portion 60 extends orthogonally to the seat portion 50 (along the third direction) from the seat portion 50 in a direction opposite to the standing direction of the straight portion 22 of the tether portion 20. The body attachment portion 60 has an external surface that has a circular shape in a cross-section orthogonal to a center axis of the body attachment portion 60.

The body attachment portion 60 has two arms 62 on its two opposite sides in the first direction D1. Each arm 62 is connected at its one end portion to the body attachment portion 60 and, except for that one end portion, is separated from the body attachment portion 60, and is elastically deformable radially relative to the circular external surface of the body attachment portion 60. Each arm 62 has a body stopper tab 64 at a position that is apart from the end portion of the arm 62 that is on the side, on which the arm 62 is connected to the body attachment portion 60, to the seat portion 50 side. Each arm 62 has, at a position apart from the body stopper tab 64 to the seat portion 50 side, a tab manipulator portion 66 for use for displacing the body stopper tab 64 in a direction orthogonal to the axis of the body attachment portion 60. The body attachment portion 60 has, at a position apart from the body stopper tab 64 to the seat portion 50 side, a collar portion 68 that extends radially outward from the external surface of the body attachment portion 60 and that is elastically deformable in the axial direction of the body attachment portion 60.

Next, a construction of a garnish attachment device 70 in accordance with the invention will be described. The garnish attachment device 70 includes the garnish 80 that has the garnish stopper hole 88, the pillar 90 of a vehicle, and the tether clip 10 that is used to attach the garnish 80 to the pillar 90. The tether clip 10 employed in the garnish attachment device 70 has the same construction as that of the above-described discrete-part tether clip 10. The garnish 80 is a front pillar garnish, and the stopper hole 88 is a garnish stopper hole, and the pillar 90 is a front pillar. The garnish 80 is attached to the pillar 90, with the longitudinal direction of the garnish 80 set to coincide with the longitudinal direction of the pillar 90.

When the tether clip 10 has been attached to the garnish 80, the first direction D1 of the tether clip 10 coincides with the width direction of the garnish 80, and the second direction D2 of the tether clip 10 coincides with the longitudinal directions of the garnish 80, and the third direction D3 of the tether clip 10 coincides with a direction that is orthogonal to the seat portion 50 and that is from the pillar 90 to the cabin side. The direction of the short sides of the rectangular garnish stopper hole 88 is set to coincide with the first direction D1 of the tether clip 10.

The garnish 80 has a general portion 82 and a housing portion 84 that is formed on the back surface of the general portion 82. The housing portion 84 is formed at a single location or each of a plurality of locations along the longitudinal direction of the garnish 80, and houses the tether portion 20 and the anchor portion 30. The housing portion 84 has a bottom wall portion 86 that is apart from the general portion 82 on the back side, and three side walls that extend between the bottom wall portion 86 and the general portion 82. The bottom wall, portion 86 is provided with the garnish stopper hole 88. The garnish stopper hole 88 is a rectangular through hole whose long sides are directed so as to be parallel to the garnish's longitudinal direction and whose short sides are directed so as to be parallel to the garnish's width directions.

In the state in which the tether clip 10 has been attached to the garnish 80, the straight portion 22 of the tether portion 20 and the standing portions 42 of the engagement retention portions 40 have been inserted in the garnish stopper hole 88, and the curved portion 24 of the tether portion 20 and the anchor portion 30 have been housed in the housing portion 84. When the anchor portion 30 is inserted into the garnish stopper hole 88, the longitudinal direction of the ginkgo leaf shape of the anchor portion 30 is set to coincide with the direction of the long sides of the garnish stopper hole 88 and, after the anchor portion 30 enters the housing portion 84, the tether clip 10 is turned 90 degrees so that the short side directions of the garnish stopper hole 88 coincide with the first direction D1 of the tether clip 10. While this state is maintained, the tether clip 10 is pressed in until the seat portion 50 closely contacts an external surface of the bottom wall portion 86. Thus, the edge portion of the garnish stopper hole 88 of the bottom wall portion 86 is retained between the seat portion 50 of the tether clip 10 and the bulge portions 44 of the engagement retention portions 40.

A curtain airbag 100 is disposed closer to the cabin side than the housing portion 84 is, in a space on the back side of the garnish 80. The curtain airbag 100 applies load F on the garnish 80 in the deployment direction.

The pillar 90 has an inner panel 92, a reinforcement 94 and an outer panel 96. The inner panel 92 is provided with a circular body stopper hole 98 to which the garnish 80 with the tether clip 10 attached is mounted via the tether clip 10. In a state in which the garnish 80 has been mounted on the pillar 90 of the vehicle, the body attachment portion 60 of the tether clip 10 extends through the body stopper hole 98 into an internal space of the pillar 90. When the body attachment portion 60 is to be inserted through the body stopper hole 98, the body stopper tabs 64 are pushed to recede by an edge portion of the body stopper hole 98. After the insertion of the body attachment portion 60, the body stopper tabs 64 elastically resume the original shape or position. After the original shape is resumed, the edge portion of the body stopper hole 98 is clamped between the body stopper tab 64 and the collar portion 68.

During a normal time when the curtain airbag 100 is not deployed, the bulge portions 44 of the tether clip 10 is stopped on the edge portion of the garnish stopper hole 88 so that the edge portion of the garnish stopper hole 88 is retained between the bulge portions 44 and the seat portion 50. During an early period of the deployment of the curtain airbag 100, when the garnish 80 opens halfway, the anchor portion 30 contacts the edge portion of the garnish stopper hole 88, and therefore stops further movement of the garnish 80 in a direction away from the pillar 90 and prevents the garnish 80 from flying apart. The curtain airbag 100 deploys to the cabin side through a clearance between the pillar 90 and an end portion of the garnish 80 at the cabin side in the width direction of the garnish 80 in a state where the garnish 80 is open halfway. In FIG. 2, the curtain airbag 100 shown by a chain double-dashed line shows a deployed state.

Since the tether portion 20 and the engagement retention portions 40 are separated from each other in the second direction D2 of the tether clip 10 in the discrete part state thereof, the tether portion 20 and each engagement retention portion 40 are separate from each other in the longitudinal direction of the garnish 80 when the tether clip 10 has been attached to the garnish 80.

Furthermore, since the clearances d in the first direction D1 of the tether clip 10 in the discrete part state of the tether clip 10 are present between the straight portion 22 of the tether portion 20 and the edge portion of the garnish stopper hole 88, the clearances d in the width directions of the garnish 80 are present between the straight portion 22 of the tether portion 20 and the edge portion of the garnish stopper hole 88 when the tether clip 10 has been attached to the garnish 80. Between the standing portions 42 of the engagement retention portions 40 and the edge portion of the garnish stopper hole 88, there are no clearances in the width direction of the garnish 80 or there are no clearances in the width directions of the garnish 80 that are as large as the clearances d between the straight portion 22 of the tether portion 20 and the edge portion of the garnish stopper hole 88.

Furthermore, since the base portion of the tether portion 20 is provided with the R portions 26 that are curved into the first direction D1 in the discrete part state of the tether clip 10, the R portions 26 curved into the garnish's width direction are present at the base portion of the tether portion 20 when the tether clip 10 has been attached to the garnish 80.

Next, operation and effects of the tether clip 10 as a discrete part will be described below. Description will be made of the case where the tether portion 20 and the engagement retention portions 40 receive load F1 in the first direction D1. Since the tether portion 20 and the engagement retention portions 40 are separate from each other, there no longer occurs load from the engagement retention portions 40 to the tether portion 20 when the load F1 acts on one or both of the engagement retention portions 40 in the first direction D1. Therefore, the load that acts on the base portion 20a of the tether portion 20 is less than the load that acts on the tether portion's base portion 120a in the related art, so that rupture of the tether portion 20 at the base portion 20a can be restrained or prevented.

Furthermore, since the tether portion 20 and the engagement retention portions 40 are separate from each other, they are deformable independently of each other in the first direction D1. Therefore, both the tether portion 20 and the engagement retention portions 40 are more flexible than the tether portion 120 and the engagement retention portions 140 of the related-art tether clip 110.

Concentration of stress at the base portion 20a of the tether portion 20 is restrained, and rupture of the tether portion 20 is restrained. In the load-stroke graph shown in FIG. 4, the rising slope of the load in the case of the invention is smaller than the slope in the case of the related art, which indicates that unevenness of the load on the tether portion 20 is restrained.

Furthermore, since the bulge portions 44 of the engagement retention portions 40 more easily deform elastically to recede, detachability of the attachment object piece (e.g., garnish) 80, to which the tether clip 10 is attached, from the engagement retention portions 44 is improved, so that it is made possible to remove the attachment object piece more easily.

Furthermore, the resistance of slide of the tether portion 20 and the anchor portion 30 on internal wall surfaces of the housing portion 84 that houses the tether portion 20 and the anchor portion 30 is reduced. Therefore, the detachability of the attachment object piece 80 from the engagement retention portions 44 is improved, and it is made easier for the attachment object piece to open. Furthermore, it becomes easy to remove the attachment object piece 80 from the tether clip 10 and attach the attachment object piece 80 to the tether clip 10.

Furthermore, in the case where the thickness of the straight portion 22 of the tether portion 20 in the first direction D1 is set to be less than the thickness of the standing portion 42 of each engagement retention portion 40, the clearances d in the first direction D1 are formed between the straight portion 22 of the tether portion 20 and the edge portion of the stopper hole 88 of the attachment object piece 80 to which the tether clip 10 is attached. Between the standing portions 42 of the engagement retention portions 40 and the edge portion of the stopper hole 88, there are no clearances or there are no clearances that are as large as the clearances d. During an early period of the deployment of the curtain airbag 100, the attachment object piece 80 is moved relative to the tether clip 10 in the first direction D1, and the tether clip 10 receives load in the first direction D1 from the attachment object piece 80. At this time, since the clearances d exist, the timing at which load is applied to the tether portion 20 is later than the timing at which load is applied to the engagement retention portions 40, by the amount of time of the movement or stroke of the attachment object piece 80 across the clearance d (see FIG. 4). Furthermore, since, during the stroke across the clearances d, the engagement retention portions 40 deform and the load F1 that acts on the tether clip 10 in the first direction D1 is reduced, the load F1 that acts on the tether portion 20 is also reduced. This also further restrains rupture of the tether portion 20 at the base portion 20a.

Furthermore, in the case where the base portion 20a of the tether portion 20 is provided with the R portions 26, there is a reduction of the concentration of stress at the base portion 20a of the tether portion 20 when the tether clip 10 receives load in the first direction D1, and the increased dimension of the base portion 20a of the tether portion 20 reduces the value of stress that occurs in the base portion 20a. This also restrains rupture of the base portion 20a of the tether portion 20. Furthermore, the edge portion of the stopper hole 88 of the attachment object piece 80 into which the tether clip 10 is attached moves in the first direction D1 and runs on the R portions 26, producing component forces in such directions that the edge portion of the stopper hole 88 slips off from the tether clip 10. This also improves the detachability of the attachment object piece 80 from the tether clip 10.

Next, operation and effects of the garnish attachment device 70 will be described. At the time of a side collision or a rollover of the vehicle, the curtain airbag 100 is deployed. During an early period of the deployment of the curtain airbag 100, the curtain airbag 100 exerts load F to the garnish 80 in the deployment direction. At this time, the load component F1 in the first direction D1 of the load F is exerted from the edge portion of the garnish stopper hole 88 onto the tether clip 10. Furthermore, a load component F3 in the third direction D3 of the load F moves the garnish 80 in the third direction D3.

Even though the load F1 acts in the first direction D1 or the load F3 acts in the third direction D3 from the garnish 80 to the tether clip 10, no load is applied from the engagement retention portions 40 to the tether portion 20 because the tether portion 20 and the engagement retention portions 40 are separate from each other, so that rupture of the tether portion 20 at the base portion 20a is restrained and the flying of the garnish 80 is prevented.

Furthermore, since the tether portion 20 and the engagement retention portions 40 are separate from each other, both the tether portion 20 and the engagement retention portions 40 are more flexible than those in the related art. As a result, concentration of stress at the base portion 20a of the tether portion 20 is restrained, and rupture of the tether portion 20 is further restrained. Furthermore, the detachability of the garnish 80 from the tether clip 10 is improved, and the garnish 80 can be deployed early. Furthermore, the resistance of slide of the tether portion 20 and the anchor portion 30 on the inner wall surface of the housing portion of the garnish 80 is reduced, and the detachability of the garnish 80 is further improved, and it becomes easy to remove the garnish 80 from the tether clip 10 and to fit the garnish 80 to the tether clip 10.

Furthermore, as the garnish 80 moves in the third direction D3 due to the load component F3 in the third direction D3, the anchor portion 30 contacts the edge portion of the garnish stopper hole 88 so that the movement of the garnish 80 in the third direction D3 stops and the garnish 80 is brought into a half-open state while the flying apart of the garnish 80 is prevented. At this time, a clearance is formed between the pillar 90 and an end portion of the garnish 80 in the width direction, and the curtain airbag 100 can be deployed through the clearance so as to protect occupants.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. A tether clip used for attaching a garnish which houses a curtain airbag to a vehicle body, comprising:
    a seat portion;
    a tether portion that stands on the seat portion;
    an anchor portion that connects to one end portion of the tether portion that is opposite to another end portion thereof that is closer to the seat portion than the one end portion;
    a pair of engagement retention portions that are engaged with a garnish stopper hole of the garnish; and
    an independence facilitation structure that is provided between the tether portion and each of the engagement retention portions and that is configured to facilitate movement of the engagement retention portions and movement of the tether portion independent of each other when the tether clip receives load in a first direction that is parallel to the seat portion and is orthogonal to a direction of a line that connects the engagement retention portions provided at both sides of the tether portion and the line is parallel to the seat portion
    the anchor portion is provided, when the engagement retention portions are disengaged from the garnish stopper hole and then the garnish opens halfway, for bringing into engagement with an edge portion of the garnish stopper hole so as to stop further opening movement of the garnish,
    wherein the independence facilitation structure includes (i) a clearance provided between the tether portion and at least an end portion of a corresponding one of the engagement retention portions, or (ii) a link portion that has a fragile portion configured to rupture when the tether clip receives the load, the link portion connecting the tether portion and a corresponding one of the engagement retention portions.

2. The tether clip according to claim 1, wherein the clearance is provided throughout an entire length of the corresponding one of the engagement retention portions.

3. The tether clip according to claim 1, wherein:
the tether portion extends in a direction orthogonal to the seat portion;
each of the engagement retention portions has a standing portion that stands on the seat portion at a corresponding one of the both sides of the tether portion, and a bulge portion that connects to the standing portion and that bulges in the first direction; and
the bulge portion is elastically deformable in the first direction.

4. The tether clip according to claim 1, wherein:
the tether portion has a straight portion that extends straight in a direction orthogonal to the seat portion.

5. The tether clip according to claim 4, wherein
the tether portion has a curved portion that connects to the straight portion.

6. The tether clip according to claim 5, wherein
the tether portion continuously and smoothly varies in cross section between the straight portion and the curved portion.

7. The tether clip according to claim 4, wherein
a thickness of the straight portion in the first direction is smaller than a minimum dimension of each one of said pair of engagement retention portions in the first direction.

8. The tether clip according to claim 7, wherein the minimum dimension is a dimension of the standing portion of said each one of said pair of the engagement retention portions in the first direction.

9. The tether clip according to claim 4, wherein:
a corner at a base portion of a side of the straight portion of the tether portion is rounded, the side of the straight portion facing in the first direction.

10. A garnish attachment device comprising:
a garnish that has a housing portion that is provided with a garnish stopper hole;
a pillar of a vehicle;
a curtain airbag disposed beside the housing portion between the garnish and the pillar;
wherein the tether clip according to claim 1 that is used to attach the garnish to the pillar of the vehicle, wherein
each of the pair of engagement retention portions has a bulge portion that bulges in the first direction and that engages with an edge portion of the garnish stopper hole and retains the edge portion of the garnish stopper hole between the seat portion and the bulge portion, and
the anchor portion is configured so that during an early period of deployment of the curtain airbag, the anchor portion is brought into engagement with the edge portion of the garnish stopper hole with the garnish open halfway so as to prevent the garnish from flying apart.

11. The garnish attachment device according to claim 10, wherein:
the first direction of the tether clip is set to coincide with a width direction of the garnish;
a second direction orthogonal to the first direction of the tether clip and parallel to the seat portion is set to coincide with a longitudinal direction of the garnish;
the garnish stopper hole is a rectangular hole; and
a direction of short sides of the garnish stopper hole is set to coincide with the first direction of the tether clip.

* * * * *